US011717760B2

(12) United States Patent
Chandrasekaran et al.

(10) Patent No.: US 11,717,760 B2
(45) Date of Patent: Aug. 8, 2023

(54) CHAT APPLICATION USING A GAMING ENGINE

(71) Applicant: Roblox Corporation, San Mateo, CA (US)

(72) Inventors: Deepak Murali Chandrasekaran, Belmont, CA (US); Claus Moberg, San Mateo, CA (US); Jessica Kung, Redwood City, CA (US)

(73) Assignee: Roblox Corporation, San Mateo, CA (US)

( * ) Notice: Subject to any disclaimer, the term of this patent is extended or adjusted under 35 U.S.C. 154(b) by 243 days.

(21) Appl. No.: 15/918,928

(22) Filed: Mar. 12, 2018

(65) Prior Publication Data
US 2019/0275434 A1 Sep. 12, 2019

(51) Int. Cl.
A63F 13/87 (2014.01)
G06T 13/20 (2011.01)

(52) U.S. Cl.
CPC .............. *A63F 13/87* (2014.09); *G06T 13/20* (2013.01); *A63F 2300/572* (2013.01)

(58) Field of Classification Search
CPC ..... A63F 13/87; A63F 2300/572; G06T 13/20
USPC ......................................................... 463/42
See application file for complete search history.

(56) References Cited

U.S. PATENT DOCUMENTS

| | | | | |
|---|---|---|---|---|
| 6,784,901 B1 * | 8/2004 | Harvey | ............... | H04L 12/1827 709/204 |
| 7,995,064 B2 * | 8/2011 | Guymon, III | ....... | H04L 12/1822 345/473 |
| 2004/0102245 A1 * | 5/2004 | Escalera | ............. | G07F 17/3211 463/32 |
| 2009/0147010 A1 | 6/2009 | Russell et al. | | |
| 2010/0041457 A1 * | 2/2010 | Cook | .................... | A63F 13/533 463/43 |
| 2010/0160012 A1 * | 6/2010 | Amaitis | ................. | G06Q 50/34 463/2 |

(Continued)

FOREIGN PATENT DOCUMENTS

| | | |
|---|---|---|
| CN | 104247336 | 12/2014 |
| CN | 105005473 | 10/2015 |

OTHER PUBLICATIONS

WIPO, International Search Report for International Patent Application No. PCT/US2019/020805, dated May 28, 2019, 2 pages.

(Continued)

*Primary Examiner* — Kang Hu
*Assistant Examiner* — Wei Lee
(74) *Attorney, Agent, or Firm* — IP Spring

(57) ABSTRACT

A system and method includes providing, by a first instance of a messaging application hosted by a game engine executing on a first client device, a user interface for messaging with a second client device; receiving first instructions to render a first three-dimensional (3D) object in the user interface of the first client device, wherein the first 3D object is initiated by a second instance of the messaging application of the second client device; rendering, by the game engine, one or more first frames to generate the first 3D object for the presentation in the user interface of the first client device based on the first instructions; and causing the presentation of the one or more first rendered frames of the first 3D object in the user interface of the first instance of the messaging application of the first client device.

20 Claims, 6 Drawing Sheets

(56) References Cited

U.S. PATENT DOCUMENTS

| | | | | |
|---|---|---|---|---|
| 2011/0014984 A1* | 1/2011 | Penman | ............... | A63F 13/34 |
| | | | | 463/42 |
| 2012/0028700 A1 | 2/2012 | Avent et al. | | |
| 2014/0315639 A1 | 10/2014 | Cao et al. | | |
| 2018/0300050 A1* | 10/2018 | Mulcahy | ............ | G06F 3/04847 |

OTHER PUBLICATIONS

WIPO, Written Opinion for International Patent Application No. PCT/US2019/020805, dated May 28, 2019, 4 pages.

CNIPA, First Office Action (with English translation) for Chinese Patent Application No. 201980027400.2, dated Jan. 25, 2022, 14 pages.

EPO, Extended European Search Report for European Patent Application No. 19766746.2, dated Oct. 26, 2021, 10 pages.

CNIPA, Notification to Go Through Formalities of Registration and Notification to Grant Patent Right for Invention (with English translation) for Chinese Patent Application No. 201980027400.2, dated Aug. 16, 2022, 6 pages.

\* cited by examiner

CHAT APPLICATION USING A GAMING ENGINE

TECHNICAL FIELD

This disclosure relates to the field of messaging applications and, in particular, a messaging application hosted by a game engine of a gaming platform.

BACKGROUND

Collaboration platforms allow users to connect to and share information with each other via the Internet. Users of a collaboration platform, such as a gaming platform, may participate in multi-user gaming environments, design custom gaming environments, decorate avatars, or exchange virtual items with other users, and so forth.

DESCRIPTION OF DRAWINGS

Various implementations of the disclosure will be understood more fully from the detailed description given below and from the accompanying drawings of various implementations of the disclosure.

DETAILED DESCRIPTION

Figure 1:
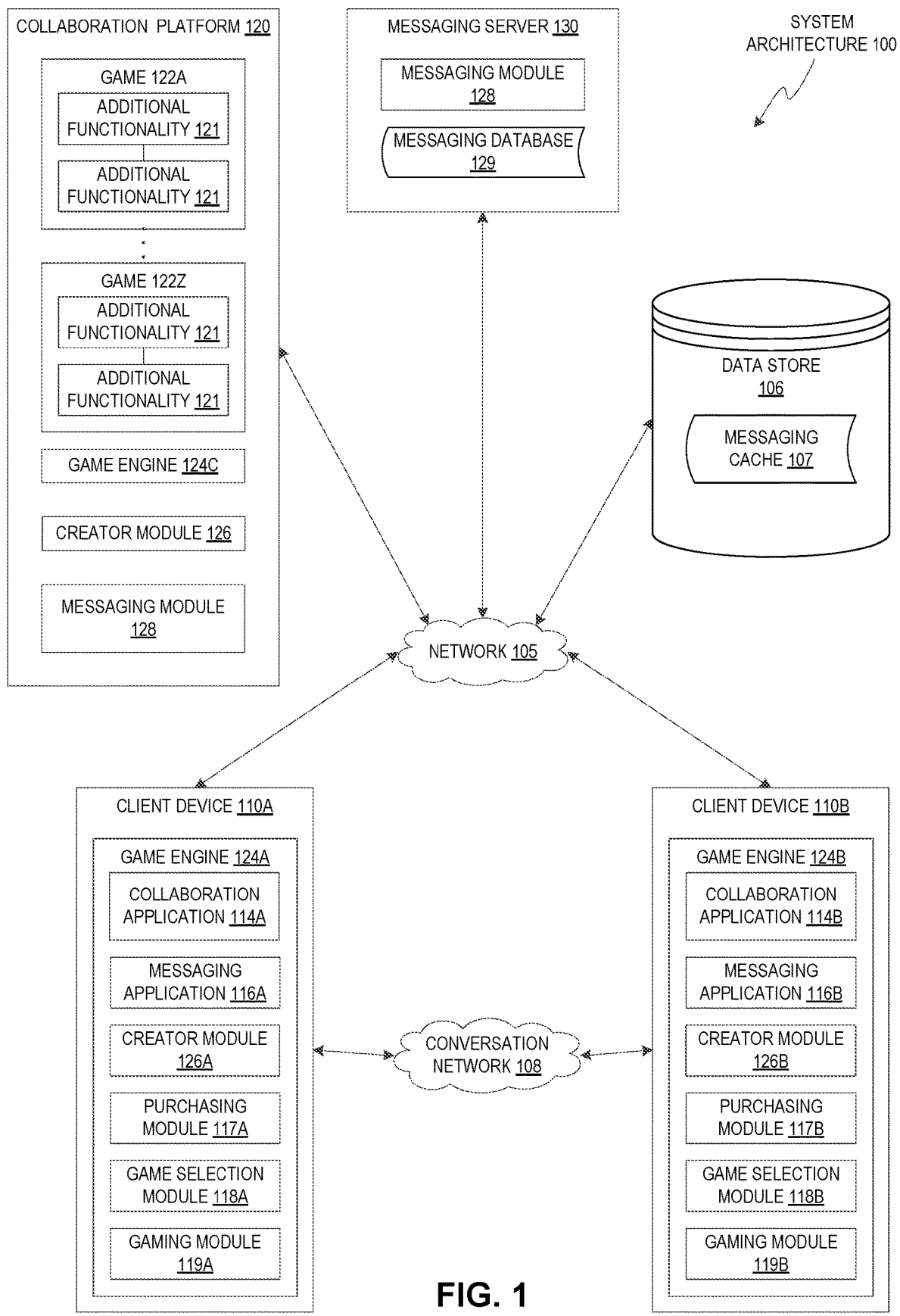
FIG. 1 illustrates an example system architecture, in accordance with implementations of the disclosure.

Collaboration platforms, such as gaming platforms, offer a variety of ways for users to interact with one another. For example, users of a gaming platform may send electronic messages to one another, work together towards a common goal, create and edit an avatar, share various gaming items with each other, and so forth. Users of a collaboration platform may play games (e.g., playing users) with characters or create games (e.g., creating users) with developmental tools via the collaboration platform. In a collaboration platform, users may send electronic messages to each other. For example, in a gaming platform, a first playing user may send an electronic message to a second playing user within a game that both the first playing user and the second playing user are playing. In some platforms, sending of electronic messages is limited to low-performance two-dimensional content such as text, an image (e.g., a Graphics Interchange Format (GIF) image), etc. The low-performance 2D content may be provided by a high-level programming code (e.g., JavaScript). In some platforms, sending of electronic messages is only available within a game when connected to a gaming server. In some platforms, sending of electronic messages is limited to in-game messaging and outside-of-game messaging, but electronic messages sent from within a game are not accessible outside of the game and electronic messages sent outside of a game are not accessible within a game. Responsive to electronic messages being limited to low performance 2D content and responsive to not having access outside of a game to the electronic messages sent via in-game messaging, users may become frustrated with the platform, spend less time on the platform, or leave the platform all together.

In some platforms, sending of electronic messages is via web applications. A web application is launched by a browser (e.g., web browser) sending a uniform resource locator (URL) to a server and receiving high-level programming code from the server to execute the web application. Portions of the web application (e.g., user interface) may run on the client device and portions of the web application may run on the server. Electronic messages sent via a web application may include electronic messages that are supported by the high-level programming code of the web application (e.g., capable of low-performance 2D content). Responsive to electronic messages being supported by the high-level programming code of the web application, users may become frustrated with messaging via web applications, spend less time using messaging via web applications, or stop using messaging in web applications altogether.

In some platforms, sending of electronic messages is via native applications. A native application is downloaded on a client device, runs directly on the client device without using a browser, and may run without network connectivity. A native application may be downloaded in its entirety on a client device. Making updates to the native application may include prompting users to download a new version of the native application. Because a native application is downloaded on a client device in its entirety, it may take up more memory or storage on a client device than a web application. A different native application may need to be created for each operating system and each type of client device. Electronic messages sent via a native application may be supported by the programming code of the native application. Responsive to a different native application being required for each platform or each type of client device and different updates being needed for each type of native application, native applications and updates to native applications may not be available for all platforms and all types of client devices. Responsive to the native application taking up more memory or storage on the client device, the native application and updates not being available for all platforms or client devices, and the electronic messages being supported by the programming code of the native application, users may become frustrated with the native application, spend less time using the native application, stop using the native application, or remove the native application from the client device.

Aspects of the disclosure address the above-mentioned and other challenges by providing a messaging application hosted by a game engine that is executing on a client device. Electronic messages sent by the messaging application hosted by the game engine are supported by game engine functionality. The game engine functionality may go beyond functionalities of high-level programming code of web applications and programming code of native applications. For example, electronic messages supported by game engine functionality may include presentation of three-dimensional (3D) objects such as 3D animations, 3D games, physical replications, 3D environments, 3D game objects, etc. Since the messaging application is hosted by the game engine, the messaging application may not need to be downloaded in its entirety to receive updates. Since the messaging application is hosted by the game engine, different versions of the messaging application may not be needed for different operating systems. Since both the messaging application and games are hosted by the game engine, messages sent and received via the messaging application concurrent with the game engine executing a game may be accessible concurrent with the game engine not executing a game, and with a game engine executing a game. For example, a user may be playing a game and chatting with a friend via a user interface. As the user exits the game, the messaging between the user and the friend may continue in another game, a lobby of the gaming platform, and so forth, using the same user interface. Additionally, a messaging application hosted by a game engine may provide messaging within the game interface. For example, a particular area of the game interface may display the game and the messages. In another example, the particular area of the game interface may be message bubbles that are associated with characters of the game and display text as well as 3D objects (e.g., as 3D animations, 3D games, physical replications, 3D environments, 3D game objects, 3D game invite, etc.).

In some implementations, a first instance of a messaging application is hosted by a game engine executing on a first client device and a second instance of the messaging application is hosted by a game engine executing on a second client device. The first instance of the messaging application may provide a first user interface for messaging with other client devices (e.g., with the second client device) and the second instance of the messaging application may provide a second user interface for messaging with other client devices (e.g., with the first client device). The first client device may receive instructions to render (e.g., commands for presentation, rendering commands, graphics library commands, etc.) a 3D object (e.g., a 3D animation) in the first user interface. The 3D object may be initiated by the second instance of the messaging application of the second client device (e.g., via user input via the second user interface). The game engine executing on the first client device may render one or more frames to generate the 3D object based on the instructions. The first client device may cause the presentation of the one or more rendered frames of the 3D object in the first user interface of the first instance of the messaging application. The first client device and the second client device may send electronic messages back and forth that cause 3D objects rendered by the game engines and messages to be displayed via each other's user interfaces. The instances of the messaging applications hosted by the game engine may be accessible in-game and outside-of-game. The 3D objects and messages sent and/or received via the instances of the messaging applications hosted by the game engine may be accessible both in-game and outside-of-game.

Accordingly, aspects of the disclosure provide 3D objects via a messaging application hosted by a game engine. In particular, the aforementioned addresses functionality challenges of messaging applications. Rendering via the game engine improves at least the technological process of generating electronic messages at least because the game engine operates using a more efficient programming code than the programming code used by web applications (e.g., JavaScript) and native applications. Rendering via the game engine improves the technological process of generating electronic messages at least because the game engine may provide higher performance content (e.g., 3D objects such as 3D animations, 3D games, physical replications, 3D environments, 3D game objects, etc.) than the content provided by the web application (e.g., low-performance 2D content) and native applications. For example, a second user may select, via a second client device, a 3D object to display via a user interface displayed via a first client device associated with a first user. The first user may select to rotate the 3D object or view the 3D object from different angles and the game engine 124 executing on the first client device may render one or more frames of the 3D object at the different angles. Portions of the messaging application (e.g., hosted by a game engine) may run on the client device and portions may run on the collaboration platform which improves operation of a computer or computer network by not requiring prompting a user to download a new version of the messaging application to update the messaging application (e.g., updates may be made to the portion of the messaging application that run on the collaboration platform). Portions of the messaging application running on the client device and portions running on the collaboration platform improves operation of a computer or computer network at least because the messaging application may take up less memory or storage on the client device than a native application. Providing electronic messages via a messaging application hosted by a game engine reduces or eliminates having a different messaging application for each operating system and type of client device. Providing 3D objects via a messaging application hosted by a game engine increases efficiency of a collaboration platform. By providing 3D objects via a messaging application hosted by a game engine, overall network bandwidth usage is reduced and results in a more efficient use of computing (processing) resources and an improved user experience.

It may be noted that a collaboration platform described as a gaming platform herein is provided for purposes of illustration, rather than limitation. A collaboration platform may be one or more of numerous platforms, such as a social networking platform, purchasing platform, a messaging platform, creation platform, and so forth. It may be further noted that aspects of the disclosure are illustrated using an example of a gaming platform and games. It may be noted that aspects of the disclosure may apply to messaging applications and 3D objects generally.

FIG. 1 illustrates an example system architecture 100, in accordance with one implementation of the disclosure. The system architecture 100 (also referred to as "system" herein) includes client devices 110A and 110B (generally referred to as "client device(s) 110" herein), a network 105, a conversation network 108, a data store 106, a collaboration platform 120, and a messaging server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, and/or a combination thereof.

In some implementations, conversation network 108 may be a computing network that provides one or more communication channels between client devices 110. In one example, conversation network 108 may be a peer-to-peer network that does not rely on a pre-existing network infrastructure (e.g., access points, switches, routers) and the client devices 110 may replace the networking infrastructure to route communications between the client devices. Conversation network 108 may be a wireless network that is self-configuring and enables client devices 110 to contribute to conversation network 108 and dynamically connect and disconnect from conversation network 108 (e.g., ad hoc wireless network). In another example, conversation network 108 may be a computing network that includes networking infrastructure that enables client devices to communicate with other client devices. In the latter example, conversation network 108 may or may not have access to the public network (e.g., the Internet). For example, a vehicle (e.g., bus, train) or location (e.g., classroom, library, café, etc.) may provide an access point or client device that may function as an access point to enable client devices to communicate with one another without providing internet access. Alternatively, the conversation network 108 may provide access to a larger network such as network 105 (e.g., the Internet). In one implementation, conversation network 108 may be based on any wireless or wired communication technology and may connect a first client device directly or indirectly (e.g., involving an intermediate client device) to a second client device. The wireless communication technology may include Bluetooth®, Wi-Fi®, infrared, ultrasonic or other technology. The wired communication may include universal serial bus (USB), Ethernet, RS 232, or other wired connection. The conversation network 108 may be an individual connection between two devices or may include multiple connections.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In some implementations, the data store 106 may include a messaging cache 107.

In implementations, the messaging server 130 may be one or more computing devices (e.g., a rackmount server, a server computer, etc.). In implementations, the messaging server 130 may be included in the collaboration platform 120, be an independent system, or be part of another system or platform. The messaging server 130 may include messaging module 128 and messaging database 129.

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120. For example, users may access collaboration platform 120 using collaboration application 114 on client devices 110. It may be noted that collaboration application 114A and 114B may generally referred to as collaboration application(s) 114. In some implementations, collaboration application 114 may be two instances of the same application.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user."

In one implementation, collaboration platform 120 may be a gaming platform, such as an online gaming platform or virtual gaming platform. For example, the gaming platform may provide single-player or multi-player games to a community of users that may access or interact with the games 122A-122Z using client devices 110 via network 105. In implementations, games 122 (also referred to as "video game," "online game," or "virtual game" herein) may be two-dimensional (2D) games, three-dimensional (3D) games, virtual reality (VR) games, or augmented reality (AR) games, for example. In implementations, a game 122 may be played in real-time with other users of the game 122.

In some implementations, a game 122 can include an electronic file that can be executed or loaded using software, firmware or hardware configured to present the game content (e.g., digital media item) to an entity. In some implementations, a game 122 may be executed by a game engine 124 (e.g., game engine 124A executing on client device 110A, game engine 124B executing on client device 110B, game engine 124C executing on collaboration platform 120, etc.) to generate a gaming video including multiple frames and audio. The gaming video may be generated (e.g., rendered) by the game engine 124 based on commands, instructions, or user input. In some implementations, a game engine 124 (e.g., a rendering engine of the game engine 124) receives user input and generates a gaming video based on the user input. In some implementations, a game engine 124 (either local to the client device 110 or at collaboration platform 120) receives user input and generates instructions (e.g., commands for presentation, rendering commands, graphics library commands, etc.) based on the user input. In some implementations, a game engine 124 (e.g., a rendering engine of the game engine 124) executing on a client device 110 receives from collaboration platform 120 the instructions and generates the gaming video based on the instructions. The gaming video may be displayed via a user interface of a client device 110.

In some implementations, collaboration platform 120 hosts games 122 and allows users to interact with the games 122 using collaboration application 114 of client devices 110. Users of collaboration platform 120 may play, create, interact with, or build games 122, or create and build objects (e.g., also referred to as "item(s)" or "game objects" or "virtual game item(s)" herein) of games 122. For example, in generating user-generated virtual items, users may create characters, decoration for the characters, one or more virtual environments for an interactive game, or build structures used in a game 122, among others. In implementations, users may buy, sell, or trade game virtual game objects, such as in-platform currency (e.g., virtual currency), with other users of the collaboration platform 120. In implementations, collaboration platform may transmit game content to collaboration applications 114. Game content (also referred to as "content" herein) may refer to any data or software instructions (e.g., game objects, game, user information, video, images, commands, media item, etc.) associated with collaboration platform 120 or collaboration applications 114.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books (eBooks), electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, instructions to render, rendering commands, user input, graphics library commands, etc.) to each of the client devices 110 to display content of the multiple users in a multi-player gaming environment. In another implementation, collaboration platform 120 may transmit the game content from one or more client devices 110 to another client device for the other client device to consolidate and display the game content. In another implementation, the collaboration platform 120 may receive the game content (e.g., first user transmitting user input via client device 110A and second user transmitting user input via client device 110B), generate game results (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user (s) with a game 122 using user account information (e.g., a user account identifier such as username and password).

In some implementations, client device 110A may include a game engine 124A, client device 110B may include a game engine 124B, collaboration platform 120 may include a game engine 124C, etc. In implementations, a game engine 124 is a software application that generates instructions to render from user input. In implementations, a game engine 124 is a software application that generates commands (e.g., rendering commands) from user input and/or from instructions to render. In implementations, a game engine 124 is a software application that renders frames (e.g., 3D objects) from instructions or commands (e.g., rendering commands). In implementations, a game engine 124 executing on a client device 110 is a software application that provides software abstraction of one or more of the graphics processing unit (GPU) of the client device 110 or a physics processing unit of the client device 110.

A game engine 124 may be a software framework. In implementations, game engine 124 may be used for the development and/or execution of games 122. In implementations, game engine 124 may include one or more of a main game program (e.g., algorithms to implement game logic), a rendering engine ("renderer") for 2D, 3D, VR, or AR graphics, a physics engine or collision detection (and collision response), an audio engine (e.g., algorithms related to sound), scripting, animation, artificial intelligence, networking, streaming, memory management, threading, localization support, scene graph, or video support for cinematics, among other features.

The physics engine may emulate laws of physics. In implementations, a physics engine can generate a simulation (e.g., perceptually correct approximation, real simulation, etc.). A physics engine may generate simulations including one or more of momentum of an object, rigid body dynamics, soft body physics (e.g., particle effects, liquid, cloth, etc.), fluid dynamics simulation (e.g., simulate liquids, flow of fire, explosions through air), collision detection between 3D objects, soft-body dynamics (e.g., toughness, plasticity, volume preservation), etc. A physics engine may disable computation of physics on objects that have not moved a threshold distance within a threshold amount of time.

The rendering engine may be a renderer of 2D and/or 3D graphics. In implementations, a game engine 124 may provide real-time 3D rendering capabilities. The rendering engine may generate 3D objects (e.g., 3D animated graphics) (e.g., via rasterization, ray-tracing, etc.). The rendering engine may be built on a rendering application programming interface (API) which provides software abstraction of the GPU. Physics APIs and physics extensions may provide a software abstraction of a physics processing unit.

A game engine 124 may be used for interactive applications with real-time graphical needs such as marketing demos, architectural visualizations, training simulations, and modeling environments. In some implementations, the game engine 124 may provide a scene graph (e.g., an object-oriented representation of the 3D game world) which simplifies game design and execution and can be used for efficient rendering of vast virtual worlds.

A game engine 124 may provide a suite of visual development tools and reusable software components. The game engine suite may provide facilities that ease development and execution of graphics, sound, physics, and AI functions. A game engine 124 may be a middleware that provides a flexible and reusable software platform that provides the core functionality to develop and execute a game 122.

A game engine 124 may provide platform abstraction, allowing the same game 122 to be run on various platforms including game consoles, personal computers, mobile devices, etc. with few, if any, changes made to the game source code.

In some implementations, a game engine 124 may be designed with a component-based architecture that allows specific systems in the game engine 124 to be replaced or extended with more specialized game middleware components (e.g., for physics, sound, video, etc.). In some implementations, a game engine 124 may be designed as a series of loosely connected game middleware components that can be selectively combined to create a custom engine.

In some implementations, an instance of game engine 124 may be included on client devices 110. In some implementations, game engine 124 of client devices 110 may work independently, in collaboration with game engine 124 of collaboration platform 120, or a combination of both.

In implementations, collaboration platform 120 may include a creator module 126. In implementations, creator module 126 may allow users to become creators to design or create environments in an existing game 122 or create new games or create new game objects within games or environments. In some implementations, a game 122 may have a common set of rules or common goal, and the environments of a game 122 share the common set of rules or common goal. In implementations, different games may have different rules or goals from one another. In some implementations, games may have one or more environments (also referred to as "gaming environments" or "virtual environment" herein) where multiple environments may be linked. For example, a user may build a virtual environment that is linked to another virtual environment created by another user. A character of the virtual game may cross the virtual border to enter the adjacent virtual environment. In implementations, game objects (e.g., also referred to as "item(s)" or "objects" or "virtual game item(s)" herein) may refer to objects that are used, created, shared or otherwise depicted in games 122 of the collaboration platform 120. For example, game objects may include a part, model, character, tools, weapons, clothing, buildings, vehicles, currency, flora, fauna, components of the aforementioned (e.g., windows of a building), and so forth.

In implementations, creator module 126 may allow a user to create, modify, or customize characters. In implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, and skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for view or use by other users of collaboration platform 120. It some implementations, creating, modifying, or customizing characters, other game objects, games 122, or game environments may be performed by a user using a user interface (e.g., developer interface) and with or without scripting (or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in data store 106. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, creator module 126 includes a unique personal build and publishing service for creating and administering games 122 and gaming environments on the Internet that allows users (also referred to as "creating users," "creators," "owners," or "owning users" herein) to create, own, or administrate games 122 and gaming environments using cloud-mediated computational resources, for example. In implementations, creator module 126 may use a user interface (also referred a "developer interface" herein) via collaboration application 114 to allow users access the functionality of creator module 126. In implementations, the developer interface may be part of collaboration application 114. For example, a developer interface of collaboration application 114 may allow a user access to a library of game objects that may be selected by the user to build a game environment or place game objects within a game 122 or environment. The user may publish their selected game objects via the developer interface so that the game objects are available to playing users of the game 122 or environment.

In implementations, collaboration platform 120 executing creator module 126 includes a user-interfacing website or application (e.g., collaboration application 114) where users may access online computational resources hosted by collaboration platform 120 for the purposes of building, administrating, editing, and interacting with personally owned games 122 or gaming environments. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114.

In implementations, creator module 126 may provide control of created games 122 and environments to owning users who may set administrative policy regarding who will be allowed to interact with the created game 122 or environment and who has the capability of modifying, editing, or interacting with the game 122 or environment. Users with administrative control may also be referred to as owning users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other collaborative or group associated online venues. In implementations, creator module 126 has administrative tools for setting such policies including or in addition to general rules for interaction within the game 122 or gaming environment.

In implementations, the client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment.

In implementations, each client device may include game engine 124 (e.g., an instance of game engine 124). In implementations, each client device 110 may include an instance of collaboration application 114. In some implementations, game engine 124 of client device 110 may include collaboration application 114 of client device 110 (e.g., an instance of collaboration application 114 of client device 110 is hosted by the game engine 124 executing on client device 110). In some implementations, collaboration application 114 of client device 110 may be separate from game engine 124. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web application (e.g., an application that operates in conjunction with a web browser, an application hosted by a web browser, an application hosted by the game engine 124) that can access, retrieve, present, and/or navigate content (e.g., virtual character in a virtual environment, etc.) served by a web server (e.g., collaboration platform). In another example, collaboration application 114 may be a native application. In another example, collaboration application 114 may be hosted by game engine 124 executing on the client device 110. The collaboration application 114 may render, display, and/or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be a collaboration platform application for users to build, create, edit, upload content to the collaboration platform 120 as well as interact with collaboration platform 120. As such, the collaboration applications 114 may be provided to the client devices 110A and 110B by the messaging server 130 or collaboration platform 120. In another example, the collaboration applications 114 may be applications that are downloaded from the messaging server 130.

In implementations, a user may login to collaboration platform 120 via collaboration application 114. The user may access a user account by providing user account information (e.g., username and password) where the user account is associated with one or more characters available to participate in one or more games 122 of collaboration platform 120.

In general, functions described in one implementation as being performed by the collaboration platform 120 can also be performed on the client devices 110A through 110B, or messaging server 130, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. The messaging module 128 on the collaboration platform may be hosted by the game engine 124 on the collaboration platform 120. In implementations, messaging server 130 may include a messaging module 128. The functionalities described as being performed by the messaging module 128 may be performed on the collaboration platform 120, the messaging server 130, or both. In implementations, a first set of functionalities of the messaging module 128 may be performed on the collaboration platform 120 and a second set of functionalities of the messaging module may be performed on the messaging server 130. In implementations, messaging module 128 may be a system, application, or module that allows users to exchange electronic messages via a communication system, such as network 105. In some implementations, users may exchange electronic messages via conversation network 108. Messaging module 128 may be associated with messaging application 116 (e.g., module of messaging application 116) or be a separate application.

In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

Users may access messaging module 128 using an instance of messaging application 116 on client devices 110. It may be noted that messaging applications 116A and 116B may generally be referred to as messaging application(s) 116. In some implementations, messaging applications 116A and 116B may be two instances of the same application.

In implementations, messaging module 128 may facilitate the exchange of electronic messages between users. For example, a user may be logged into a messaging application 116A on client device 110A, and another user may be logged into a messaging application 116B on client device 110B. The two users may start a conversation, such as an instant messaging conversation. Messaging module 128 may help facilitate the messaging conversation by sending and receiving the electronic messages between the users of collaboration platform 120.

An instance of messaging application 116 of client device 110 may be hosted by the game engine 124 executing on client device 110. In some implementations, game engine 124 of client device 110 may include messaging application 116 of client device 110. In some implementations, messaging application 116 of client device 110 may be separate from game engine 124. In one implementation, the messaging application 116 may be an application that allows users to use and interact with messaging module 128, such as to transmit an electronic message (e.g., text, images, video items, web pages, documents, 3D objects, etc.) to another client device 110 (e.g., in a virtual game executing on the game engine 124 or without the game engine 124 executing one or more games). In one example, the messaging application 116 is hosted by the game engine 124 and the messaging application 116 can access, retrieve, present, and/or navigate content (e.g., a 3D object, a 3D animation, etc.) served by a web server (e.g., collaboration platform 120). In another example, messaging application 116 may be a native application. The messaging application 116 may render, display, and/or present the content (e.g., frames of a 3D object, frames of a 3D animation) to a user. The messaging application 116 may be a standalone application (e.g., a mobile application, app, or a gaming program) that allows users to interact with messaging module 128. According to aspects of the disclosure, the messaging application 116 may be a collaboration platform application for users to build, create, edit, upload content to the messaging module 128 for transmission to another client device 110. As such, the messaging applications 116 may be provided to the client devices 110A and 110B by the messaging server 130 or collaboration platform 120. In another example, the messaging applications 116 may be applications that are downloaded from the messaging server 130.

In implementations, a user may provide user input to a first instance of the messaging application 116A hosted by game engine 124A executing on client device 110A. The user input may include a message (e.g., text, an image, etc.) and instructions to display a 3D object. In implementations, the client device 110A may transmit the message to the messaging module 128 of messaging server 130 and the client device 110A may transmit the instructions (e.g., the 3D object, the user input corresponding to the 3D object, rendering commands, graphics library commands, etc.) to render the 3D object to the messaging module 128 on the collaboration platform 120. The messaging module 128 of the messaging server 130 may process the message (e.g., determine if the message includes inappropriate material, determine if the client device is authorized to send the message, etc.) and transmit the message to another client device 110B. The messaging module 128 of the collaboration platform 120 may process the instructions to render the 3D object (e.g., determine if the 3D object has inappropriate material, determine if the client device is authorized to send the 3D object, etc.) and may transmit the instructions to render the 3D object to another client device 110B. The client device 110A may transmit the message and the instructions to render the 3D object in conjunction with each other (e.g., at the same time, at substantially the same time) and the client device 110B may present the rendered frames of the 3D object and the message in conjunction with each other (e.g., at the same time, at substantially the same time).

Game engine 124 of client device 110 (e.g., game engine 124A and 124B) may include additional modules (e.g., creator module 126, purchasing module 117, game selection module 118, gaming module 119, etc.). In implementations, one or more of the additional modules may be a separate application. In implementations, one or more of the additional modules may be part of collaboration application 114 (e.g., an add-in). One or more of the additional modules may be hosted by the game engine 124 of the client device 110. The game engine 124 of the client device 110 may be in a first state where the game engine 124 is not executing a game 122. The game engine 124 of client device 110 may be in a second state where the game engine 124 is executing a game 122. In some implementations, the game engine 124 may transition between the first state and the second state, and vice versa. The messaging application 116 may be capable of transmitting electronic messages concurrently with the game engine 124 being in the first state and concurrently with the game engine being in the second state. Messages transmitted by the messaging application 116 concurrently with the game engine being in the first state may be accessible concurrently with the game engine being in the second state, and vice versa. For example, the messaging application 116 may have a common message history (e.g., messaging cache 107, etc.) of messages sent and/or received concurrent with the game engine being in the first state and concurrent with the game engine being in the second state.

A game 122 or additional module may be hosted by a game engine 124 executing on the client device 110 (e.g., the game or additional module may be executing). During the execution of the game or additional module, a corresponding interface may be displayed via the client device 110. In implementations, the messaging application 116 may display a messaging interface separate from the corresponding interface of the game or additional module (e.g., the messaging interface may be a separate window from a window of the corresponding interface of the game or additional module). In implementations, the messaging application 116 may display a messaging interface within the corresponding interface of the game or additional module (e.g., the messaging interface may be a portion of the corresponding interface, see messaging interface 430 of FIG. 4B).

In some implementations, the additional modules on the client device 110 include an instance of a creator module 126. The instance of the creator module 126 on the client device 110 may be hosted by game engine 124 and may display a creator interface (e.g., a creator window) for creating or editing one or more of a game 122, game content, an avatar, etc. The creator module 126 may include different modules. For example, the creator module 126 may include an avatar editing module. While an instance of the creator module 126 is hosted (e.g., executed) by a game engine 124 executing on client device 110, a creator interface may be displayed via the client device 110. An instance of the messaging application 116 may be used to send and receive electronic messages (e.g., text, 3D objects, etc.) within a portion of the creator interface (e.g., within the creator window provided by the creator module 126).

In some implementations, the additional modules on the client device 110 include an instance of a purchasing module 117. The instance of the purchasing module 117 on the client device 110 may be hosted by game engine 124 and may display a purchasing interface (e.g., a purchasing window) for purchasing, sharing, or transferring objects, such as game content. While an instance of the purchasing module 117 is hosted (e.g., executed) by a game engine 124 executing on client device 110, a purchasing interface may be displayed via the client device 110. An instance of the messaging application 116 may be used to send and receive electronic messages (e.g., text, 3D objects, etc.) within a portion of the purchasing interface (e.g., within the purchasing window provided by the purchasing module 117).

In some implementations, the additional modules on the client device 110 include an instance of a game selection module 118. The instance of the game selection module 118 on the client device 110 may be hosted by game engine 124 and may display a game selection interface (e.g., a game selecting window) for selecting a game to play, for viewing a list of available games, for searching for games, for viewing how many or which users are playing different games, for viewing information about games, etc. While an instance of the game selection module 118 is hosted (e.g., executed) by a game engine 124 executing on client device 110, a game selection interface may be displayed via the client device 110. An instance of the messaging application 116 may be used to send and receive electronic messages (e.g., text, 3D objects, etc.) within a portion of the game selection interface (e.g., within the game selecting window provided by the game selection module 118).

In some implementations, the additional modules on the client device 110 include an instance of a gaming module 119. The instance of the gaming module 119 on the client device 110 may be hosted by game engine 124 and may display a gaming interface (e.g., a gaming window) for playing a game, observing game play, collaborating with other users in a game, etc. While an instance of the gaming module 119 is hosted (e.g., executed) by a game engine 124 executing on client device 110, a gaming interface may be displayed via the client device 110. An instance of the messaging application 116 may be used to send and receive electronic messages (e.g., text, 3D objects, etc.) within a portion of the gaming interface (e.g., within the gaming window provided by the gaming module 119). It may be noted that the a user interface for the messaging application may show messages or have message continuity as the user moves from the various interfaces described above, e.g., moves from the gaming interface to a purchasing interface.

For the sake of illustration, rather than limitation, messaging module 128 is described as implemented on collaboration platform 120 and messaging server 130. In some implementations, messaging module 128 may in part or wholly be implemented on collaboration platform 120. In some implementations, messaging module 128 may in part or wholly be implemented on messaging server 130. In some implementations, messaging module 128 may in part or wholly be implemented on client device 110. In some implementations, messaging module 128 operating on one or more of client device 110, messaging server 130, or collaboration platform 120 may work in conjunction to perform the operations described herein. Although implementations of the disclosure are discussed in terms of collaboration platforms, implementations may also be generally applied to any type of social network providing connections between users.

In implementations, messaging application 116 may allow a user to interface with messaging module 128 of collaboration platform 120 and messaging server 130. In implementations, messaging application 116 of client devices 110 may be a separate application or part of collaboration application 114 (e.g., add-in).

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
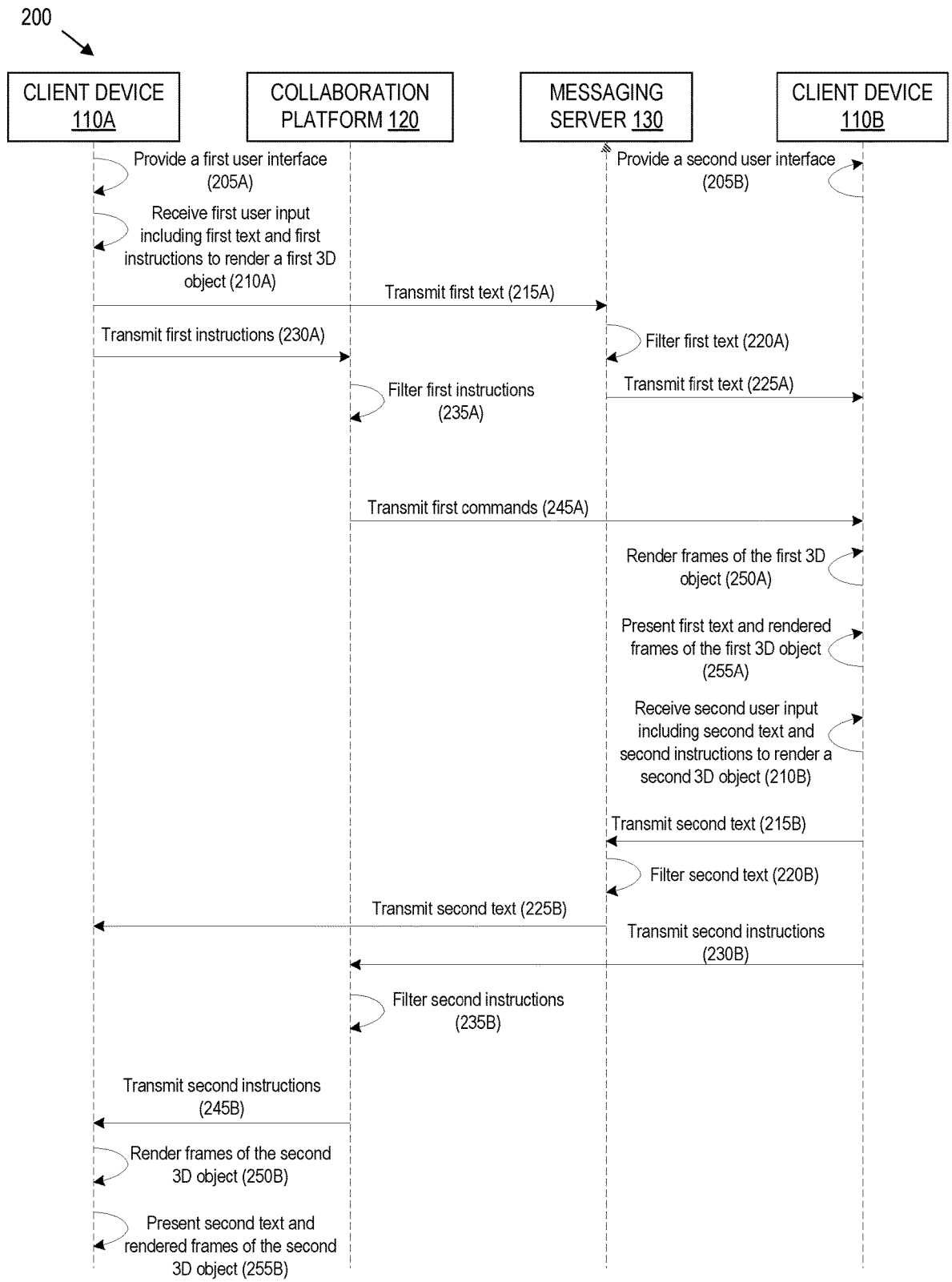
FIG. 2 is a diagram of operations for using a messaging application hosted by a game engine, in accordance with some implementations.

FIG. 2 is a diagram of operations of using a messaging application 116 hosted by a game engine 124, in accordance with some implementations. System 200 may include similar components as system architecture 100 as described with respect to FIG. 1. It may be noted that components of FIG. 1 may be used herein to help describe FIG. 2. In implementations, instances of messaging applications 116 hosted by game engines 124 executing on client devices 110 may perform some or all of the operations. In other implementations, the instances of the messaging applications 116 may interact with the messaging module 128 on the collaboration platform 120 and/or the messaging server 130 to perform operations described with respect to FIG. 2. For purpose of illustration, rather than limitations, operations described as performed by messaging applications 116 of client devices 110 may be performed by any component of collaboration platform 120 and/or messaging server 130, unless otherwise described. For purpose of illustration, rather than limitations, operations described as performed by messaging module 128 may be performed by any component of client device 110, unless otherwise described. It may be noted that for the purposes of illustration, rather than limitation, "first user" is a user associated client device 110A and "second user" is a user associated with client device 110B. The operations described with respect to FIG. 2 are shown to be performed serially for the sake of illustration, rather than limitations. It may be noted that in implementations the operations may be performed in any order, may be performed multiple times, or may include the same, fewer, or additional operations. It may be noted that for purposes of illustration, rather than limitation that operations are described as being performed by collaboration platform 120 or messaging server 130. In some implementations, the operations of collaboration platform 120 and messaging server may be performed by one of collaboration platform 120 or messaging server 130.

In implementations, users may establish a relationship (e.g., trusted relationship, friendship, connection) via collaboration platform 120 prior to sending and receiving electronic messages (e.g., text, 3D objects) to each other. In implementations, a first user may send a request to transmit an electronic message to a second user and the second user may accept the request prior to the first user and second user being able to send electronic messages to each other and receive electronic messages from each other. In implementations, a first user may transmit an identifier of a second user (e.g., a user name, a personal identifier, a code, etc.) to the collaboration platform 120 and the collaboration platform 120 may grant the first user permission to transmit electronic messages to the second user prior to the first user being able to send an electronic message to the second user.

In implementations, users may perform login operations to login to collaboration platform 120 prior to being able to send electronic messages to each other and receive electronic messages from each other. In one example, a first user may supply login information, such as user account information (e.g., user name and password) to collaboration platform 120 via collaboration application 114 or messaging application 116. In implementations, the collaboration platform 120 may verify the login information and responsive to the verification, allow the first user access to collaboration platform 120 and user account content associated with the first user account. In other implementations, the second user of client device 110B may perform a similar login operation as described above with respect to first user of client device 110A.

Returning to FIG. 2, in implementations, at operation 205A, client device 110A may provide a first user interface (operation 205A) for display by the client device 110A. The client device 110A may provide the first user interface via a first instance of a messaging application 116A hosted by a gaming engine 124A executing on the client device 110A. In some implementations, a user interface is a separate window (e.g., a messaging window). The messaging window may be moved independent to other windows. In some implementations, a user interface is portion or area of a window (e.g., a portion of a gaming window, a chat box within a window, chat bubbles proximate avatars). The chat box may be moved within the gaming window.

At operation 210A, the client device 110A may receive, via the user interface, first user input. User input via a user interface, may be via a display device 510 (e.g., touch screen), an alphanumeric input device 512 (e.g., a keyboard), a cursor control device 514 (e.g., a mouse), sound input device (e.g., a microphone), movement input device (e.g., a motion sensor), an imaging device (e.g., a camera), etc. (see FIG. 5). The user input may include first text and first instructions to render a first 3D object. For example, a first user may type text and select a 3D animation of an avatar (e.g., a 3D animation that makes the avatar appear to be jumping out of the screen).

The client device 110 may process the first user input to determine whether the first input includes text and/or instructions to render a 3D object. In implementations, the client device 110 may determine that the first input includes first text that corresponds to the messaging server 130 and that the first input includes instructions to render a first 3D object that correspond to the collaboration platform 120. In implementations, the game engine 124 executing on the client device 110 determines that the first text corresponds to the messaging server 130 and that the instructions to display the first 3D object correspond to the collaboration platform 120. In implementations, the messaging application 116 hosted by the game engine 124 executing on the client device 110 determines that the first text corresponds to the messaging server 130 and that the instructions to render the first 3D object correspond to the collaboration platform 120.

In some implementations, at operation 215A, the client device 110A may transmit the first text to the messaging server 130 (e.g., responsive to determining that the first text corresponds to the messaging server 130). At operation 220A, the messaging server 130 may filter the first text (e.g., process the first text to determine whether the first text is appropriate). At operation 225A, the messaging server 130 may transmit the first text to the client device 110B. At operation 230A, the client device 110A may transmit the first instructions to the collaboration platform 120 (e.g., responsive to determining that the first instructions correspond to the collaboration platform 120). In some implementations, the collaboration platform 120 may process the first instructions of the first 3D object to determine whether the first 3D object is appropriate.

The filtering operations (e.g., operation 220A, operation 235A) may include one or more of blocking inappropriate language, blocking inappropriate subject matter, blocking inappropriate images, blocking sensitive information (e.g., contact information), blocking communication with or by minors, blocking communication of users that have not established a relationship via the collaboration platform 120, blocking users that have not logged into the collaboration platform, etc. In some implementations, the client devices 110 transmit the text and/or instructions directly to each other (e.g., via conversation network 108, via network 105). The blocking of information may include one or more of blocking the entire electronic message, obscuring the information from the electronic message, removing the information from the electronic message, or replacing the information in the electronic message (e.g., replacing inappropriate language or sensitive information with one or more symbols, such as the pound sign (#)).

In some implementations, the game engine 124A executing on the client device 110A may receive the first instructions to render the first object and the game engine 124A executing on the client device 110A may generate commands (e.g., rendering commands, graphics library commands, etc.) based on the first instructions. In some implementations, the collaboration platform 120 may receive the first instructions from the client device 110A and the game engine 124 executing on the collaboration platform 120 may generate first commands based on the first instructions.

At operation 245A, the collaboration platform 120 may transmit the first instructions to the client device 110B (e.g., subsequent to the corresponding filtering operation).

At operation 205B, the client device 110B may provide a second user interface 202B via a second instance of the messaging application 116B hosted by game engine 124B executing on the client device 110B. At operation 225A, the client device 110B may receive first text and at operation 250A, the client device 110B may render, by the gaming engine 124B executing on the client device 110B based on the first instructions, frames of the first 3D object for presentation with the first text in the second user interface. The game engine 124B executing on the client device 110B may generate first commands (e.g., first rendering commands) based on the first instructions and may render the frames of the first 3D object based on the first commands. At operation 255A, the client device 110B may cause the presentation of the rendered frames of the first 3D object and the first text in the second user interface of the second instance of the messaging application 116B of the second client device 110B.

Rendering of frames may be performed by a rendering engine of game engine 124. The rendering engine may receive the commands and/or instructions to render and generate a frame based on the commands and/or instructions. The rendering engine may generate a frame based on capabilities of the client device 110 (e.g., processing overhead, screen resolution, etc.). For example, the rendering engine may render a lower quality frame when there is high processing overhead or when there is low screen resolution. The rendering engine may generate a frame based on user input via the client device 110 that is receiving the instructions. The user input may include one or more of camera position, player viewpoint, etc.

At operation 210B, the client device 110B may receive, via the second user interface, second user input. The second user input may include second text and second instructions to render a second 3D object. One or more of the second text or the second 3D object may be in response to the first text or the first 3D object.

At operation 215B, the client device 110B may transmit the second text to the messaging server 130 and, at operation 230B, the client device 110B may transmit the second instructions to render the second 3D object to the collaboration platform 120. At operation 220B, the messaging server 130 may perform a filtering operation on the second text and, at operation 235B, the collaboration platform 120 may perform a filtering operation on the second instructions to render the second 3D object. At operation 245B, the collaboration platform 120 may transmit the second instructions to the client device 110A (e.g., subsequent to the filtering operation). At operation 225B, the messaging server 130 may transmit the second text to the client device 110A (e.g., subsequent to the filtering operation).

At operation 250B, the client device 110A may render, by the game engine 124A based on the second instructions, one or more frames of the second 3D object. At operation 255B, the client device 110B may present the second text and the second 3D object in the first user interface.

The sending and receiving of electronic messages may be between two or more users. The electronic messages may include one or more of text, a 3D object, a 2D object, an image, a GIF image, etc.

Figure 3:
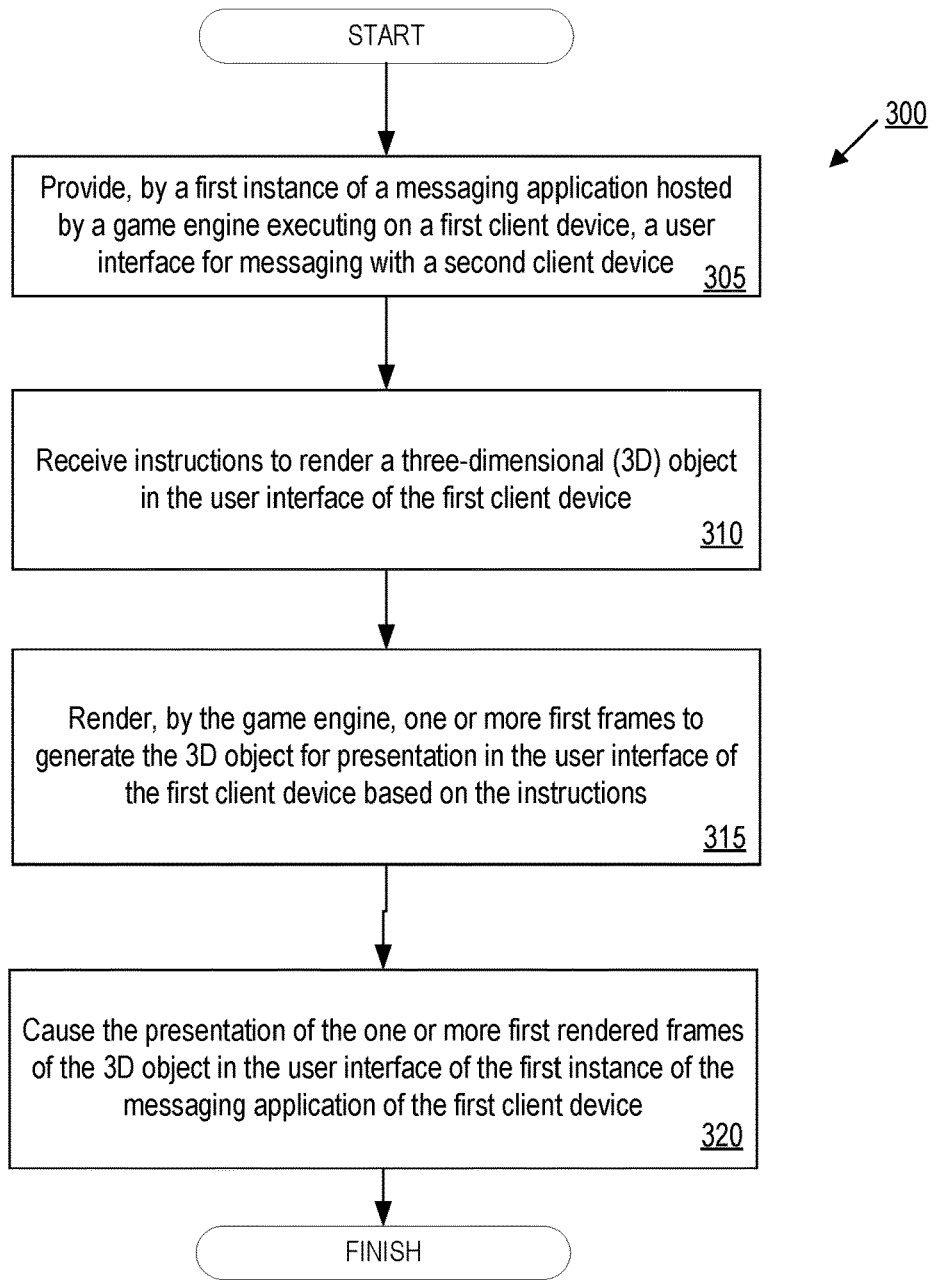
FIG. 3 is a flow diagram illustrating a method of using a messaging application hosted by a game engine, in accordance with implementations of the disclosure.

FIG. 3 is a flow diagram illustrating method 300 of using a messaging application hosted by a game engine, in accordance with implementations of the disclosure. Method 300 may be performed by processing logic that includes hardware (e.g., circuitry, dedicated logic, programmable logic, microcode), software (e.g., instructions run on a processing device to perform hardware simulation), or a combination thereof. In some implementations, processing logic executing at collaboration platform 120, messaging server 130, client device 110A, client device 110B or combination thereof may perform some or all of the operations. In some implementations, processing logic, in collaboration with messaging application 116 and/or messaging module 128, may perform some or all the operations. Components of FIG. 1 may be used to help illustrated method 300. It may be appreciated that the in some implementations, method 300 may include the same, different, fewer, or greater operations performed in any order.

Method 300 begins at block 305 where processing logic provides, by a first instance of a messaging application 116A hosted by a game engine 124A executing on a first client device 110A, a user interface for messaging with a second client device 110B. In some implementations, the user interface is the messaging interface 430 of FIGS. 4A-B.

At block 310, processing logic receives instructions to render (e.g., rendering commands, graphics library commands) a 3D object in the user interface of the first client device 110A. The instructions may be initiated by a second instance of the messaging application 116 of a second client device 110B. In some implementations, the 3D object is a 3D animation. A 3D animation may include two or more frames that are automatically rendered from instructions and/or commands by the game engine 124 (e.g., via rendering engine of game engine 124) and shown in sequence over time. The 3D animation may show movement. For example, the 3D object may be two or more frames that show the avatar of the second user jumping out of the messaging interface 430. Frames rendered by a game engine 124 (executing on a client device 110 that is receiving the instructions) from instructions to render (e.g., rendering commands) may be different from frames streamed to a client device 110. For example, the frames rendered by a game engine 124 from instructions and/or commands may be rendered or generated based on capabilities of the client device 110 (e.g., screen resolution), settings of the client device 110 (e.g., camera position, viewpoint), quality currently allowed by the client device (e.g., based on processor overhead, etc.). Additionally, frames rendered by a game engine 124 are generated at the client device, rather than sent via a network in a compressed format, or otherwise.

In some implementations, the 3D object is a physical replication or physical interaction between physically simulated objects. In some implementations, the 3D object is a 3D environment. In some implementations, the 3D object is a mini-game. For example, the 3D object may be a physically replicated game of rock-paper-scissors (executed by the game engine 124) that can be played in a chat feed of the messaging interface 430.

In some implementations, the second client device 110B may receive user input. In some implementations, the game engine 124 executing on the second client device 110B receives the user input and generates instructions to render based on the user input. In some implementations, the game engine 124 executing on the collaboration platform 120 receives the user input from the second client device 110B and the game engine 124 executing on the collaboration platform 120 generates the instructions to render. In some implementations, transmission of the instructions and/or user input requires less bandwidth and processing overhead (e.g., for the collaboration platform 120, etc.) than transmitting the rendered one or more frames of the 3D object. Instructions to render may be transmitted and received despite having a poor upload connection or poor speed. Receiving instructions yields a less jittery and an uncompressed viewing experience for the user of the client device 110 than receiving rendered frames of a 3D object.

By receiving instructions, a first client device 110A may display a perspective (e.g., camera position, etc.) that is different than that of the 3D object corresponding to the user input of the second client device 110B. For example, a second user may select a 3D object to display via the user interface of the first user. The first user may select to rotate the 3D object or view the 3D object from different angles and the game engine 124 executing on the client device 110A may render one or more frames of the 3D object at the different angles. Receiving the instructions at the first client device 110A and rendering the 3D object (e.g., at different angles) by the game engine 124 executing on the client device 110A is more interactive than receiving frames of a 3D object from the second client device 110B.

In some implementations, the instructions may include an identifier (e.g., a unique identifier) of an object (e.g., asset) that is to be rendered. In some implementations, the instructions may include size of the object (e.g., as determined by the user that is to send the instructions, as determined by the collaboration platform 120). In some implementations, the instructions may include location of the object (e.g., as determined by the user that is to send the instructions, as determined by the collaboration platform 120). In some implementations, the instructions may include user input sequences. For example, if the object may be a pendulum that swings according to user input. A first user of a first client device 110A and a second user of a second client device 110B may both provide user input (e.g., simultaneously, substantially simultaneously) to swing the pendulum. In some implementations, the instructions may include dynamic updates. For example, a first client device 110A may transmit instructions to a second client device 110A to render a current snapshot of an avatar. The first client device 110A or the collaboration platform 120 may subsequently transmit instructions of dynamic updates of the avatar (e.g., a new current snapshot, latest version of the avatar syncing with the collaboration platform 120).

In some implementations, the instructions to render are rendering commands (e.g., commands to the renderer, rendering calls). In some implementations, the game engine 124 of the client device 110 that receives the instructions to render may generate rendering commands from the instructions to render. Rendering commands may be instructions (e.g., geometry information, mathematical representation of objects) to a rendering engine of a game engine 124 to generate a visible image of objects (e.g., virtual world scenes, game characters, 3D objects). A rendering engine of a game engine 124 may process rendering commands to generate image data (e.g., frames) that can be displayed via a display device. The image data may be a succession of image frames. Rendering commands may be significantly smaller (e.g., 1% or less the size of) than rendered frames (e.g., than a rendered 3D object). If the rendering engine of the game engine 124 executing on the first client device 110A is compatible with the game engine 124 (e.g., the game engine 124 executing on the second client device 110B, the game engine executing on the collaboration platform 120) that generated the rendering commands, the game engine 124 executing on the first client device 110A may render frames of the 3D object based on the rendering commands.

In some implementations, the instructions to render are graphics library commands (e.g., low-level graphics library commands generated by a graphics processing unit (GPU) or game engine 124). In some implementations, the game engine 124 of the client device 110 that receives the instructions to render may generate graphics library commands from the instructions to render. If the graphics library (e.g., low-level graphics library) corresponding to the graphics library commands is downloaded on the first client device 110A, the first client device 110A (e.g., the game engine 124 executing on the first client device 110A) can render the one or more frames of the 3D object from the graphics library commands.

In some implementations, the instructions to render are user sequence of inputs and game state. In some implementations, the game engine 124 of the client device 110 that receives the instructions to render may generate user sequence of inputs and game state from the instructions to render. If the first client device 110A includes a game engine 124 and a gaming program (e.g., a deterministic program that generates the same output from the same user input and game state, a game 122, collaboration application 114, messaging application 116) that correspond to the sequence of inputs and game state (e.g., that correspond to the game engine 124 and game program executing on the second client device 110B), the game engine 124 and game program executing on the first client device 110A may render the one or more frames of the 3D object based on the sequence of user inputs and game state.

In some implementations, the instructions to render are the user input. In some implementations, the game engine 124 of the client device 110 that receives the instructions to render may generate user input from the instructions to render. If the game engine 124 and messaging application 116 executing on the first client device 110A correspond to the game engine 124 and messaging application 116 executing on the second client device 110B, the first client device 110A may render the one or more frames of the 3D object based on the user input.

At block 315, processing logic renders, by the game engine 124, one or more first frames to generate the first 3D object for presentation in the user interface of the first client device 110A based on the first instructions. In implementations, rendering may be generating (e.g., by a rendering engine of a game engine 124) one or more images from instructions or commands. Frames may be images that are rendered based on the instructions or commands by a rendering engine of a game engine 124 executing on the client device 110 (e.g., at a quality, settings, etc. of the client device 110). The game engine 124 may render the one or more first frames at a quality (e.g., resolution, shading, lighting, amount of game content displayed, 3D or 2D, etc.) based on the processing capabilities of the first client device 110A. For example, if the first client device 110A has low processing capabilities (e.g., has a high current processing overhead, has hardware that has a low processing speed), the game engine 124 may render the one or more first frames at a lower quality than if the first client device 110A were to have higher processing capabilities. Transmitting instructions or commands instead of rendered frames can lower processing overhead for the first client device 110A.

At block 320, processing logic causes the presentation of the one or more rendered frames of the 3D object in the user interface of the first instance of the messaging application of the first client device 110A.

In response to the presentation of the rendered frames of the 3D object in the user interface of the client device 110A, the first user may initiate another 3D object to be rendered by the game engine 124 executing on the second client device 110B to be presented to the second user. The first and second user may cause 3D images to be displayed back in forth on each other's client devices 110A. In some implementations, the causing 3D images to be displayed via each other's client devices 110A is the playing of a 3D mini-game in the messaging interface 430 (e.g., in the user interface 400, in the game interface 450, etc.).

Figure 4A:
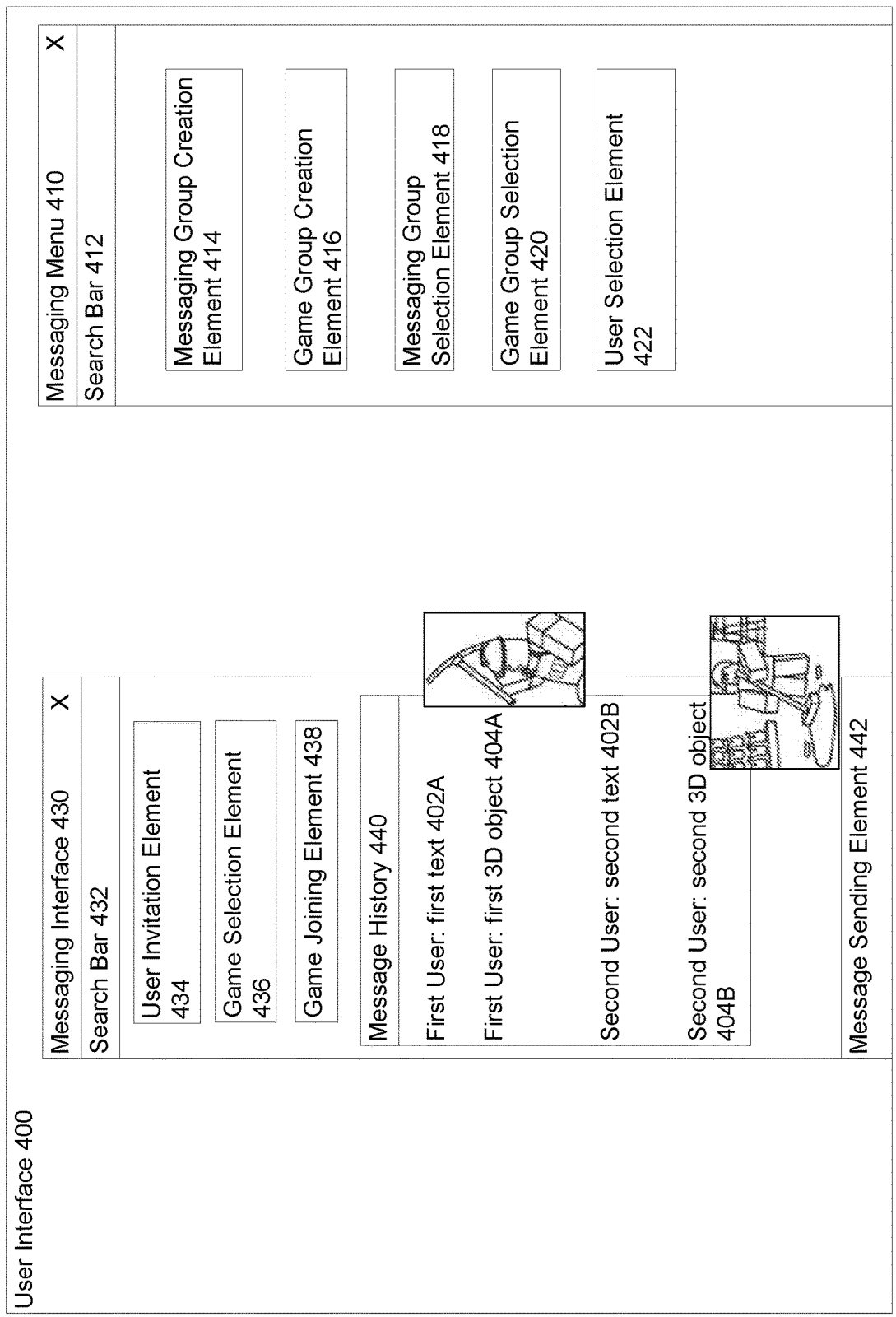
FIG. 4A illustrates a user interface for using a messaging application hosted by a game engine, in accordance with some implementations of the disclosure.

FIG. 4A illustrates a user interface 400 for using a messaging application 116 hosted by a game engine 124, in accordance with some implementations of the disclosure.

In one implementation, user interface 400 is a messaging interface provided by the messaging application 116 and/or the messaging module 128 (e.g., of the messaging server 130 and/or collaboration platform 120). A user may select the user interface 400 to send electronic messages to and receive electronic messages from other users.

In one implementation, user interface 400 is a collaboration platform interface provided by the collaboration platform 120 and/or the collaboration application 114. A user may select the collaboration interface to interact with games, media items, etc.

In one implementation, user interface 400 is a creator interface provided by creator module 126 for creating or editing one or more of a game 122, game content, an avatar, etc. For example, a creator interface may be used to create, interact with, or build games 122, or create and build objects of games 122 (e.g., user-generated virtual items, characters, decoration for the characters, one or more virtual environments for an interactive game, structures used in a game 122, etc.).

In one implementation, user interface 400 is a purchasing interface provided by purchasing module 117 for purchasing, sharing, or transferring objects, such as game content. For example, purchasing interface may be used to buy, sell, or trade game virtual game objects, such as in-platform currency, with other users of the collaboration platform 120.

In one implementation, user interface 400 is a game selection interface provided by game selection module 118 for selecting a game to play, for viewing a list of available games, for searching for games, for viewing how many or which users are playing different games, for viewing information about games, etc.

The messaging application 116 hosted by game engine 124 executing on client device 110 may provide messaging functionalities to user interface 400. Responsive to user input (e.g., selecting a messaging icon (not shown) on the user interface 400), the user interface 400 may display a messaging menu 410. The messaging menu 410 may display one or more of a search bar 412, a messaging group creation element 414, a game group creation element 416, a messaging group selection element 418, a game group selection element 420, a user selection element 422.

The search bar 412 may be used to search for users, messaging groups, or game groups. The messaging group creation element 414 may be used to start a group message with a plurality of users, where the messages sent and received via the group message are viewable to the plurality of users. The game group creation element 416 may be used to start a group message with a plurality of users, where the plurality of users can join a game 122 together (e.g., follow each other into a game). The messaging group selection element 418 may be used to request to join a messaging group. The messaging group selection element 418 may display one or more messaging groups that the user may join (e.g., trending groups, groups that contain one or more users with whom the user has established a relationship via the collaboration platform 120, etc.). The game group selection element 420 may be used to request to join a game group (e.g., to be able to follow the other users in the game group into games 122). The game group selection element 420 may display one or more game groups that the user may join (e.g., trending game groups, game groups that contain one or more users with whom the user has established a relationship via the collaboration platform 120, etc.). The user selection element 422 may be used to message a second user or to transmit a request to be able to message the second user. The user selection element 422 may display one or more users with whom the user may message (e.g., users with whom the user has established relationships, users that are currently connected to the collaboration platform 120 via the network 105, etc.).

A messaging group of two or more users may have access to a messaging interface 430 to perform messaging (e.g., transmit electronic messages to and receive electronic messages from each other). In response to a user of the messaging group transmitting an electronic message via messaging interface 430 of the user, the electronic message may be displayed in each of the messaging interfaces 430 of the users of the messaging group. The messaging interface 430 may be used for messaging between two individuals, messaging between three or more individuals, game messaging (e.g., that provides the option to follow each other into a game 122) between two or more individuals, etc. Messaging interface 430 may be displayed in response to creating or selecting a messaging or game group, in response to selecting a user, etc. The messaging interface 430 may display a search bar 432, a user invitation element 434, a game selection element 436, a game joining element 438, message history 440, a message sending element 442.

As shown in FIG. 4A, the user interface 400, the messaging menu 410, and the messaging interface 430 may be separate windows. In implementations, the messaging menu 410 and/or messaging interface 430 may be docked to the window of the user interface 400. In some implementations, the user interface 400, the messaging menu 410, and the messaging interface 430 may be moved independent to each other.

In another implementation, the messaging menu 410 and/or the messaging interface 430 may be a portion of the window of user interface 400. In implementations, the messaging interface 430 and/or messaging menu 410 may be moved within the window of the user interface 400. In response to one or more first user inputs, the messaging menu 410 and/or messaging interface 430 may be minimized in the window of the user interface 400 (e.g., only an identifier of the messaging menu 410 or messaging interface 430 may be displayed without displaying other elements or message history). In response to one or more second user inputs, the messaging menu 410 and/or messaging interface 430 may be maximized in the window of the user interface 400 (e.g., the elements or message history may be displayed again after being minimized). In response to one or more third user inputs, the messaging menu 410 and/or messaging interface 430 may pop-out of the window of the user interface 400 and become a separate window. In response to one or more third user inputs, the messaging menu 410 and/or messaging interface 430 may be closed.

The search bar 432 may be used for search for users to invite to the messaging group corresponding to the messaging interface 430. User invitation element 434 may display one or more users that the user may select to add to the messaging group. The game selection element 436 may be used to search for and/or select a game 122 that the messaging group (e.g., game group) may join. Each user of the messaging group may select game joining element 438 to join a game 122 with each other (e.g., to follow each other into a game). The message history 440 may display electronic messages (e.g., text, 3D objects, etc.) transmitted or received via the messaging interface 430. A user may provide user input (e.g., text, instructions to display a 3D object, etc.) via the message sending element 442 to transmit the corresponding text and/or 3D object to other users in the messaging group.

A user may be messaging via a first type of user interface 400 and the user may select to display a second type of user interface 400. For example, the user may be messaging via the creator interface and the user may select to display the purchasing interface. The message history 440 displayed in the first type of user interface 400 may be available via the second type of user interface 400. For example, if a first user sends first text 402A, sends first 3D object 404A, receives second text 402B, and receives second 3D object 404B via the creator interface, the first text 402A, first 3D object 404A, second text 402B, and second 3D object 404B may be available via the purchasing interface.

Figure 4B:
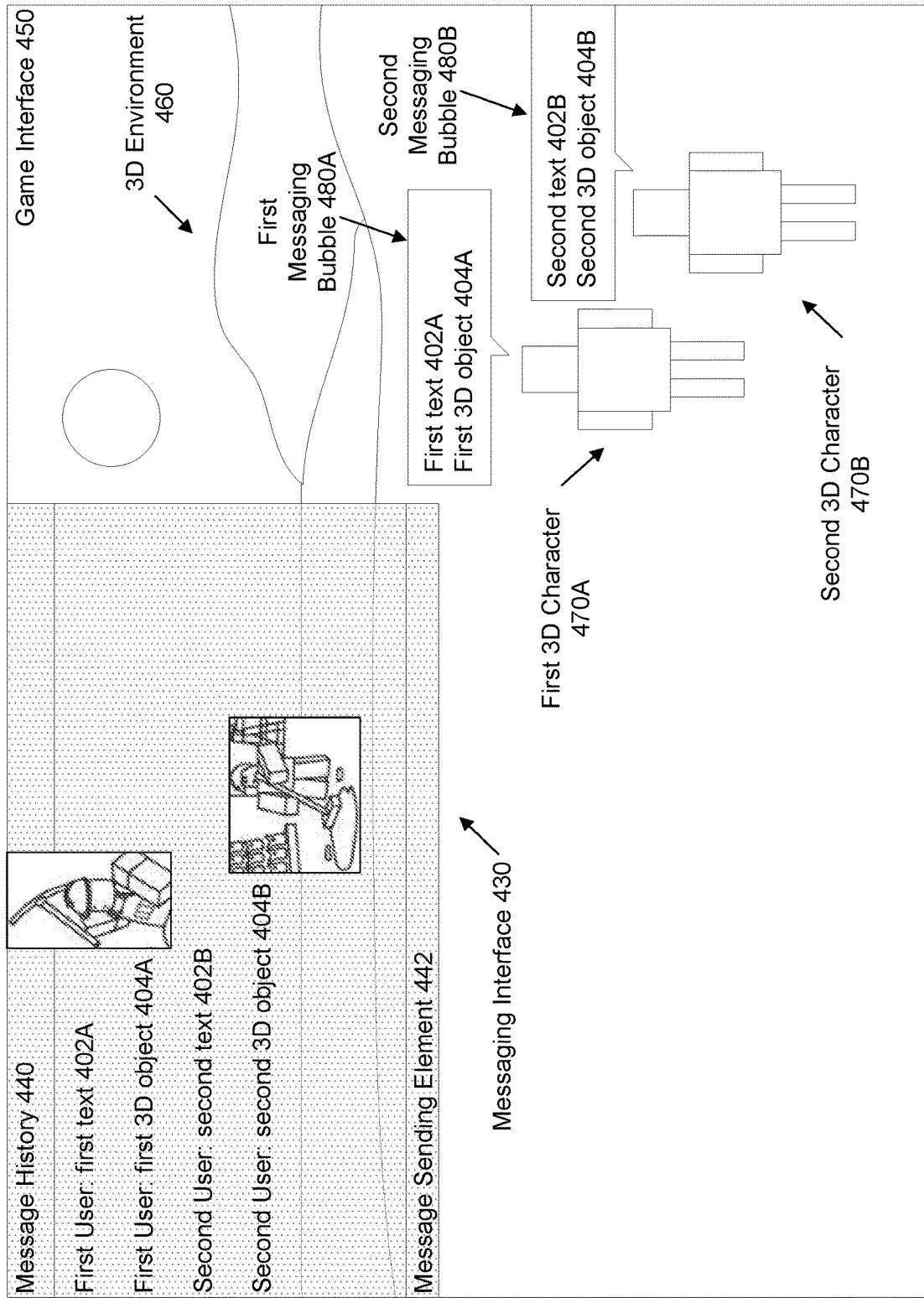
FIG. 4B illustrates a game interface for using a messaging application hosted by a game engine, in accordance with some implementations of the disclosure.

A user may be messaging via user interface 400 and the user may select to join a game 122 which causes display of game interface 450 (see FIG. 4B). For example, the user may be messaging via the creator interface and the user may select to join a game 122 which causes display of the game interface. The message history 440 displayed in the user interface 400 may be available via the game interface 450. For example, if a first user sends first text 402A, sends first 3D object 404A, receives second text 402B, and receives second 3D object 404B via the creator interface, the first text 402A, first 3D object 404A, second text 402B, and second 3D object 404B may be available via the game interface 450.

FIG. 4B illustrates a game interface 450 for using a messaging application 116 hosted by a game engine 124, in accordance with some implementations of the disclosure.

Game interface 450 may be provided by gaming module 119 or collaboration application 114 for playing a game 122, observing game play, collaborating with other users in a game 122, etc. The game interface 450 may display 3D game content rendered by the game engine 124 executing on the client device 110. The 3D game content may include 3D environment 460 and 3D characters 470.

Responsive to user input (e.g., joining a game via user interface 400 or via game selection interface), a client device 110 may display game interface 450.

The game interface 450 may display the messaging history 440 from user interface 400, as described with respect to FIG. 4A. The game interface 450 may allow at least two or more users of the messaging group to continue messaging, as the user transfers from one interface (e.g., user interface 400) to another interface (e.g., game interface 450). The messaging history 440 may be updated by electronic messages sent and received via the game interface 450. Responsive to leaving the game 122, the updated messaging history 440 may displayed via user interface 400. Responsive to joining the game 122, an updated messaging history 440 (e.g., including messages sent and received via user interface 400) may be displayed via the game interface 450.

Electronic messages sent and received via the user interface 400 and the game interface 450 may include 3D objects rendered by the game engine 124 executing on the client device 110.

In some implementations, a messaging interface 430 may be displayed via an area of the game interface 450. As shown in FIG. 4B, the messaging interface 430 may be a semi-transparent interface that overlays a portion of the game interface 450. The game interface 450 may be visible through the messaging interface 430. In some implementations, the messaging interface 430 may be moved within the game interface 450 (e.g., may be docked in different locations). In some implementations, the messaging interface 430 may be in a fixed location within the game interface 450.

As shown in FIG. 4B, the messaging interface 430 may display the message history 440. The messaging history 440 may include text and 3D objects transmitted and/or received via other interfaces. For example, first text 402A, first 3D object 404A, second text 402B, and second 3D object 404B may have been transmitted and/or received via the messaging interface 430 of user interface 400 of FIG. 4A. Responsive to launching a game, the first text 402A, first 3D object 404A, second text 402B, and second 3D object 404B that were transmitted and/or received via user interface 400 may be displayed in the message history 440 of messaging interface 430 in the game interface 450 of FIG. 4B. The messaging interface 430 may include a message sending element 442 to send electronic messages, such as text and 3D objects.

In another implementation, the game interface 450 may be a window and the messaging interface 430 may be a window that can be moved independent from the window of the game interface 450. Responsive to user input, the messaging interface 430 may be docked in the window of the game interface 450. Responsive to user input, the messaging interface may pop-out (become its own window) to be moved independent of the window of the game interface 450.

In another implementation, at least a portion of the message history 440 may be displayed via one or more messaging bubbles 480 that are displayed proximate 3D characters 470. In one implementation, the messaging bubbles 480 are displayed instead of displaying the messaging interface 430. In another implementation, the messaging bubbles 480 are displayed in addition to the messaging interface. In FIG. 4B, the messaging bubbles 480 are illustrated as areas of the game interface 450. In another implementation, the messaging bubbles 480 may be windows. The dialog in the messaging bubbles 480 may be transferred between different interfaces outside of the game (e.g., outside of the game interface 450).

In an implementation, if a first user corresponds to first 3D character 470A, a first messaging bubble 480A may display one at least a portion of text and/or 3D objects sent by the first user. The messaging bubbles 480 may be semi-transparent to be able to see game content behind the messaging bubbles 480. The transparency of the messaging interface 430 and the messaging bubbles 480 may change based on one or more of how recent the last electronic message was sent, if a new electronic message is being entered, if the messaging interface 430 or messaging bubble 480 is overlapping 3D characters 470 or other messaging bubbles 480, etc.

Figure 5:
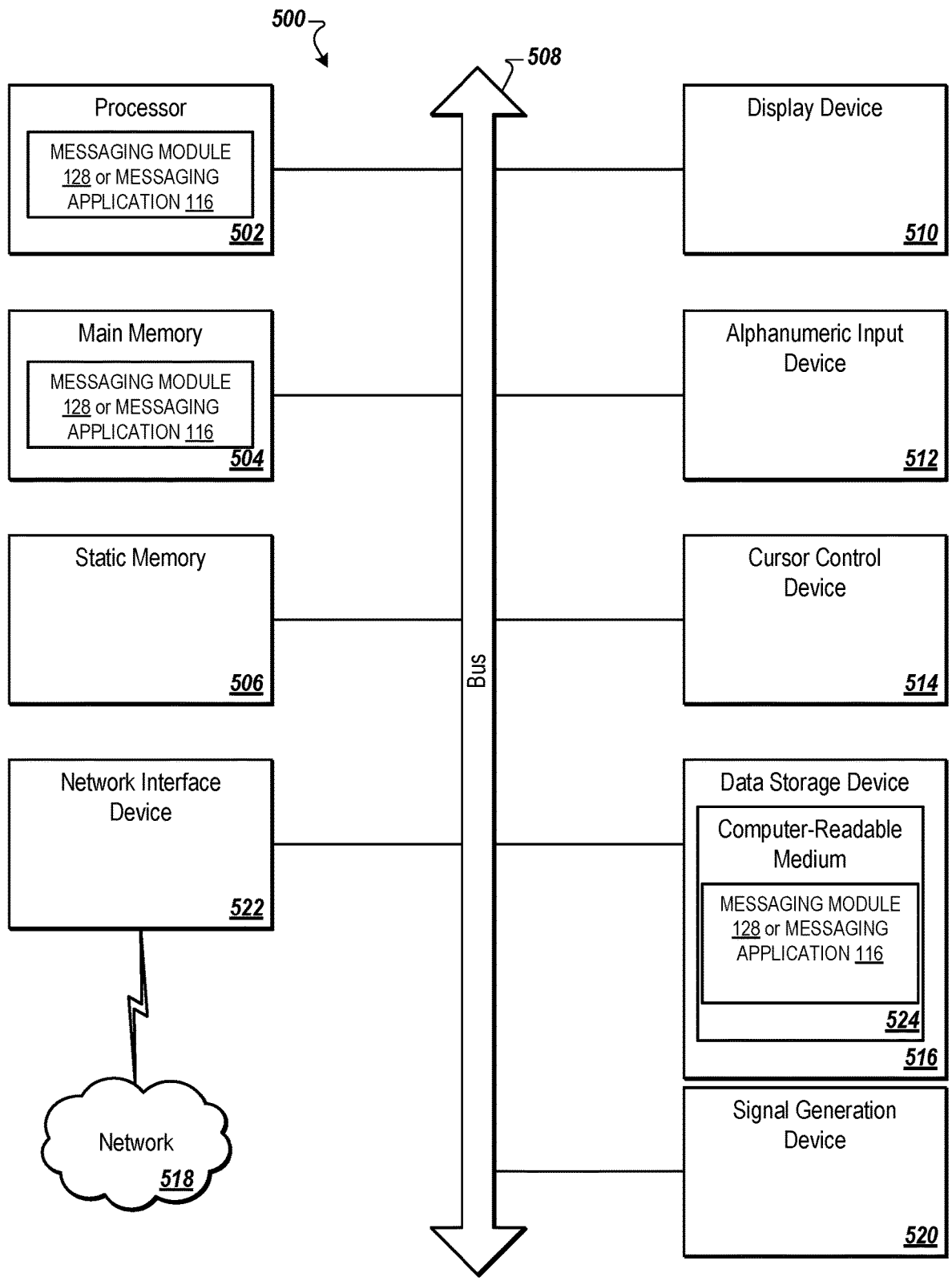
FIG. 5 is a block diagram illustrating an exemplary computer system, in accordance with implementations of the disclosure.

FIG. 5 is a block diagram illustrating an exemplary computer system 500, in accordance with implementations. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of messaging module 128 or messaging application 116. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 and embodying any one or more of the methodologies or functions described herein. The sets of instructions of the system architecture 100 and may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "providing," "receiving," "rendering," "causing," "sending," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

We claim:

1. A first client device, comprising:
a memory; and
a processing device coupled to the memory and operable to:
provide, by a first instance of a messaging application hosted by a game engine that executes on the first client device, a user interface for messaging with a second client device;
receive first instructions to render a first three-dimensional (3D) object in the user interface provided by the first instance of the messaging application of the first client device, wherein the first instructions to render the first 3D object are initiated by a second instance of the messaging application at the second client device;
render, by the game engine based on the first instructions, one or more first frames of the first 3D object for presentation in the user interface provided by the first instance of the messaging application of the first client device; and
cause the presentation of the rendered one or more first frames of the first 3D object in the user interface provided by the first instance of the messaging application of the first client device, wherein:
responsive to the first instructions, a viewing angle of the first 3D object displayed in the user interface provided by the first instance of the messaging application of the first client device is controllable so as to be distinct from a viewing angle of the first 3D object displayed at the second client device,
the user interface, which includes the first 3D object and which is provided by the first instance of the messaging application of the first client device, is a separate window from a window of a game interface for playing a game executed by the game engine,
the game engine enables the first and second instances of the messaging application to continue messaging between the first client device and the second client device in the user interface after exiting the game, wherein the continued messaging by the first and second instances of the messaging application is concurrent with continued execution of the game engine on the first client device after the game is exited and is no longer being executed by the game engine, and wherein the continued messaging by the first and second instances of the messaging application after exiting the game occurs via Internet access to a messaging server connected between the first and second client devices, the messaging application is different from a native messaging application of the first client device, and by being hosted by the game engine, the messaging application is operable to perform the messaging with 3D objects rendered by the game engine after the game is exited, portions of the messaging application run on the first client device and on a collaboration platform that provides games for the game engine, so as to avoid prompting a user of the first user device to download a new version of the messaging application to update the messaging application, because updates are made to the portion of the messaging application that run on the collaboration platform, and the first 3D object is part of a mini-game separate from the game.

2. The first client device of claim 1, wherein the game engine further enables the presentation of the rendered one or more first frames of the first 3D object in the user interface, provided by the first instance of the messaging application of the first client device, to be concurrent with a presentation of the game on the first client device via the game interface, and wherein messages between the first and second client devices, which are communicated between the first and second client devices while the game engine is executing the game, are accessible by the first client device for presentation in the user interface after exiting the game.

3. The first client device of claim 1, wherein the presentation of the rendered one or more first frames of the first 3D object in the user interface provided by the first instance of the messaging application occurs concurrently with the game engine operating in a first state in which the game engine does not execute the game, including after exiting the game, and wherein after exiting the game, the user interface continues the messaging, between the first client device and the second client device, in another game or in a lobby of the collaboration platform that provides games for the game engine.

4. The first client device of claim 3, wherein the processing device is further operable to:

provide, by the first instance of the messaging application, an area of the game interface for messaging;

receive second instructions to render a second 3D object in the area of the game interface provided by the first instance of the messaging application of the first client device, wherein the second instructions to render the second 3D object are initiated by the second instance of the messaging application at the second client device;

render, by the game engine based on the second instructions, one or more second frames of the second 3D object for presentation in the area of the game interface provided by the first instance of the messaging application of the first client device; and cause the presentation of the rendered one or more second frames of the second 3D object in the area of the game interface provided by the first instance of the messaging application of the first client device concurrent with the game engine operating in a second state, and wherein in the second state, the game engine executes the game that is presented in the game interface, and wherein messages between the first and second client devices, which are communicated between the first and second client devices while the game engine is in the second state and executing the game, are accessible by the first client device for presentation in the user interface when the game engine is in the first state and not executing the game after the game is exited.

5. The first client device of claim 4, wherein the rendered one or more first frames of the first 3D object presented in the user interface are accessible via the area of the game interface, and wherein the rendered one or more second frames of the second 3D object presented in the area of the game interface are accessible via the user interface.

6. The first client device of claim 1, wherein the first 3D object includes a 3D animation.

7. The first client device of claim 1, wherein the first instructions are received by a server of the collaboration platform from the second instance of the messaging application at the second client device.

8. The first client device of claim 1, wherein the processing device is operable to:

receive a message comprising text for presentation in the user interface provided by the first instance of the messaging application, wherein the message is sent by the second instance of the messaging application at the second client device; and cause the presentation of the message in the user interface provided by the first instance of the messaging application of the first client device.

9. The first client device of claim 1, wherein the processing device is further operable to:

send, via the first instance of the messaging application to the second client device, a message that includes third instructions to render a third 3D object by the second client device.

10. The first client device of claim 1, wherein the processing device is further operable to generate rendering commands based on the first instructions, and wherein the rendering, by the game engine, the one or more first frames is based on the rendering commands.

11. A non-transitory computer-readable storage medium having instructions stored thereon that, responsive to execution by a processing device of a first client device, cause the processing device to perform operations comprising:

providing, by a first instance of a messaging application hosted by a game engine that executes on the first client device, a user interface for messaging with a second client device;

receiving first instructions to render a first three-dimensional (3D) object in the user interface provided by the first instance of the messaging application of the first client device, wherein the first instructions to render the first 3D object are initiated by a second instance of the messaging application at the second client device;

rendering, by the game engine based on the first instructions, one or more first frames of the first 3D object for presentation in the user interface provided by the first instance of the messaging application of the first client device; and causing the presentation of the rendered one or more first frames of the first 3D object in the user interface provided by the first instance of the messaging application of the first client device, wherein:

responsive to the first instructions, a viewing angle of the first 3D object displayed in the user interface provided by the first instance of the messaging application of the first client device is controllable so as to be distinct from a viewing angle of the first 3D object displayed at the second client device, the user interface, which includes the first 3D object and which is provided by the first instance of the messaging application of the first client device, is a separate window from a window of a game interface for playing a game executed by the game engine, the game engine enables the first and second instances of the messaging application to continue messaging between the first client device and the second client device in the user interface after exiting the game, wherein a user associated with the first client device plays the game, wherein the window of the game interface for playing the game is not displayed upon exiting the game by the first user, wherein the continued messaging by the first and second instances of the messaging application is concurrent with continued execution of the game engine on the first client device after the game is exited and is no longer being executed by the game engine, and wherein the continued messaging by the first and second instances of the messaging application after exiting the game occurs via Internet access to a messaging server between the first and second client devices, the messaging application is different from a native messaging application of the first client device, and by being hosted by the game engine, the messaging application is operable to perform the messaging with 3D objects rendered by the game engine after the game is exited, portions of the messaging application run on the first client device and on a collaboration platform that provides games for the game engine, so as to avoid prompting the user of the first user device to download a new version of the messaging application to update the messaging application, because updates are made to the portion of the messaging application that run on the collaboration platform, and the first 3D object is part of a mini-game separate from the game.

12. The non-transitory computer-readable storage medium of claim 11, wherein the presentation of the rendered one or more first frames of the first 3D object in the user interface provided by the first instance of the messaging application occurs concurrently with the game engine operating in a first state in which the game engine does not execute the game, including after exiting the game, and wherein after exiting the game, the user interface continues the messaging, between the first client device and the second client device, in another game or in a lobby of the collaboration platform that provides games for the game engine.

13. The non-transitory computer-readable storage medium of claim 12, wherein the operations further comprise:

providing, by the first instance of the messaging application, an area of the game interface for messaging;

receiving second instructions to render a second 3D object in the area of the game interface provided by the first instance of the messaging application of the first client device, wherein the second instructions to render the second 3D object are initiated by the second instance of the messaging application at the second client device;

rendering, by the game engine based on the second instructions, one or more second frames of the second 3D object for presentation in the area of the game interface provided by the first instance of the messaging application of the first client device; and causing the presentation of the rendered one or more second frames of the second 3D object in the area of the game interface provided by the first instance of the messaging application of the first client device concurrent with the game engine operating in a second state, and wherein in the second state, the game engine executes the game that is presented in the game interface, and wherein messages between the first and second client devices, which are communicated between the first and second client devices while the game engine is in the second state and executing the game, are accessible by the first client device for presentation in the user interface when the game engine is in the first state and not executing the game after the game is exited.

14. The non-transitory computer-readable storage medium of claim 13, wherein the rendered one or more first frames of the first 3D object presented in the user interface are accessible via the area of the game interface, and wherein the rendered one or more second frames of the second 3D object presented in the area of the game interface are accessible via the user interface.

15. The non-transitory computer-readable storage medium of claim 11, wherein the operations further comprise:

receiving a message comprising text for presentation in the user interface provided by the first instance of the messaging application, wherein the message is sent by the second instance of the messaging application at the second client device; and causing the presentation of the message in the user interface provided by the first instance of the messaging application of the first client device.

16. A method, comprising:

providing, by a first instance of a messaging application hosted by a game engine that executes on a first client device, a user interface for messaging with a second client device;

receiving first instructions to render a first three-dimensional (3D) object in the user interface provided by the first instance of the messaging application of the first client device, wherein the first instructions to render the first 3D object are initiated by a second instance of the messaging application at the second client device;

rendering, by the game engine based on the first instructions, one or more first frames of the first 3D object for presentation in the user interface provided by the first instance of the messaging application of the first client device; and causing the presentation of the rendered one or more first frames of the first 3D object in the user interface provided by the first instance of the messaging application of the first client device, wherein:

responsive to the first instructions, a viewing angle of the first 3D object displayed in the user interface provided by the first instance of the messaging application of the first client device is controllable so as to be distinct from a viewing angle of the first 3D object displayed at the second client device, the user interface, which includes the first 3D object and which is provided by the first instance of the messaging application of the first client device, is a separate window from a window of a game interface for playing a game executed by the game engine, the game engine enables the first and second instances of the messaging application to continue messaging between the first client device and the second client device in the user interface after exiting the game, wherein the continued messaging by the first and second instances of the messaging application is concurrent with continued execution of the game engine on the first client device after the game is exited and is no longer being executed by the game engine, and wherein the continued messaging by the first and second instances of the messaging application after exiting the game occurs via Internet access to a messaging server between the first and second client devices, the messaging application is different from a native messaging application of the first client device, and by being hosted by the game engine, the messaging application is operable to perform the messaging with 3D objects rendered by the game engine after the game is exited, portions of the messaging application run on the first client device and on a collaboration platform that provides games for the game engine, so as to avoid prompting a user of the first user device to download a new version of the messaging application to update the messaging application, because updates are made to the portion of the messaging application that run on the collaboration platform, and the first 3D object is part of a mini-game separate from the game.

17. The method of claim 16, wherein the presentation of the rendered one or more first frames of the first 3D object in the user interface provided by the first instance of the messaging application occurs concurrently with the game engine operating in a first state in which the game engine does not execute the game, including after exiting the game, and wherein after exiting the game, the user interface continues the messaging, between the first client device and the second client device, in another game or in a lobby of the collaboration platform that provides games for the game engine.

18. The method of claim 17, further comprising:

providing, by the first instance of the messaging application, an area of the game interface for messaging;

receiving second instructions to render a second 3D object in the area of the game interface provided by the first instance of the messaging application of the first client device, wherein the second instructions to render the second 3D object are initiated by the second instance of the messaging application at the second client device;

rendering, by the game engine based on the second instructions, one or more second frames of the second 3D object for presentation in the area of the game interface provided by the first instance of the messaging application of the first client device; and causing the presentation of the rendered one or more second frames of the second 3D object in the area of the game interface provided by the first instance of the messaging application of the first client device concurrent with the game engine operating in a second state, and wherein in the second state, the game engine executes the game, and wherein messages between the first and second client devices, which are communicated between the first and second client devices while the game engine is in the second state and executing the game, are accessible by the first client device for presentation in the user interface when the game engine is in the first state and not executing the game after the game is exited.

19. The method of claim 18, wherein the rendered one or more first frames of the first 3D object presented in the user interface are accessible via the area of the game interface, and wherein the rendered one or more second frames of the second 3D object presented in the area of the game interface are accessible via the user interface.

20. The method of claim 16, wherein the first instructions are received by a server of the collaboration platform from the second instance of the messaging application at the second client device.

* * * * *